US012037146B2

(12) United States Patent
Singh et al.

(10) Patent No.: US 12,037,146 B2
(45) Date of Patent: Jul. 16, 2024

(54) SMART TAMPING SYSTEM FOR DOSAGE OPTIMIZATION IN CAPSULE FILLING MACHINE

(71) Applicants: Scitech Centre, Mumbai (IN); ACG Pam Pharma Technologies PVT. LTD., Mumbai (IN)

(72) Inventors: Karan Singh, Mumbai (IN); Roy Cook, Mumbai (IN); Mahesh Barde, Mumbai (IN); Swapnil Desai, Mumbai (IN); Akash Jadhav, Mumbai (IN)

(73) Assignees: Scitech Centre, Mumbai (IN); ACG Pam Pharma Technologies PVT. LTD., Mumbai (IN)

( * ) Notice: Subject to any disclaimer, the term of this patent is extended or adjusted under 35 U.S.C. 154(b) by 270 days.

(21) Appl. No.: 17/629,653

(22) PCT Filed: Jul. 23, 2020

(86) PCT No.: PCT/IB2020/056956
§ 371 (c)(1),
(2) Date: Jan. 24, 2022

(87) PCT Pub. No.: WO2021/014399
PCT Pub. Date: Jan. 28, 2021

(65) Prior Publication Data

US 2022/0218567 A1 Jul. 14, 2022

(30) Foreign Application Priority Data

Jul. 24, 2019 (IN) ............................ 201921002962

(51) Int. Cl.
*B65B 1/04* (2006.01)
*A61J 3/07* (2006.01)
(Continued)

(52) U.S. Cl.
CPC ................ *B65B 1/04* (2013.01); *A61J 3/074* (2013.01); *B65B 1/24* (2013.01); *B65B 1/32* (2013.01); *B65B 57/16* (2013.01)

(58) Field of Classification Search
CPC .... B65B 1/32; B65B 1/04; B65B 1/24; B65B 1/30; B65B 57/16; B65B 1/16
(Continued)

(56) References Cited

U.S. PATENT DOCUMENTS 2,720,109 A * 10/1955 Stirn ........................ G01N 9/00 141/73
3,357,155 A * 12/1967 Carruthers ................ B65B 1/24 53/526
(Continued)

FOREIGN PATENT DOCUMENTS

CN 102579265 A 7/2012
EP 3295920 A1 3/2018

OTHER PUBLICATIONS

International Search Report and Written Opinion dated Nov. 9, 2020 in corresponding application PCT/IB2020/056956, 8 pgs.

*Primary Examiner* — Valentin Neacsu
(74) *Attorney, Agent, or Firm* — Melissa M. Hayworth; E. Joseph Gess; Merchant & Gould, P.C.

(57) ABSTRACT

The present invention relates to a tamping system (100) for tamping of filler materials of capsule filling machine to form slug, and selectively delivering the slug from a dosing disc (108) based on the presence/absence of empty capsule bodies in an empty capsule segment in a turret of capsule filling machine. The tamping system (100) based on the presence/absence of empty capsule bodies in the empty capsule segment, enables actuation of pneumatic cylinders (113) to restrict movement of tamping pistons (110) into the respective holes of the dosing disc (108) that were configured to be align with the empty capsule segments of the
(Continued)

turret where no capsule bodies were identified or present, irrespective of the downward movement of the holder blocks (111) towards the dosing disc (108), thereby restricting the delivery of the slug into empty capsule segment of the turret, and preventing wastage of the filler material or slug.

19 Claims, 10 Drawing Sheets

(51) Int. Cl.

| | |
|---|---|
| ***B65B 1/24*** | (2006.01) |
| ***B65B 1/32*** | (2006.01) |
| ***B65B 57/16*** | (2006.01) |

(58) Field of Classification Search
USPC .............................. 53/502, 527; 141/146, 71
See application file for complete search history.

(56) References Cited

U.S. PATENT DOCUMENTS

| | | | | | |
|---|---|---|---|---|---|
| 4,163,354 | A * | 8/1979 | Austin | A61J 3/074 53/282 |
| 4,781,567 | A * | 11/1988 | Miller, Jr. | B30B 11/005 425/804 |
| 4,864,876 | A * | 9/1989 | Botzolakis | A61J 3/074 73/862.541 |
| 6,050,308 | A * | 4/2000 | Wurst | G01F 11/24 141/81 |
| 6,837,280 | B2 * | 1/2005 | Ragazzini | B65B 3/32 141/73 |
| 8,607,828 | B2 * | 12/2013 | Stutzman | B65B 43/60 141/144 |
| 2001/0035431 | A1 * | 11/2001 | Runft | A61J 3/074 141/81 |
| 2009/0078335 | A1 * | 3/2009 | Stutzman | B65B 1/36 141/129 |
| 2012/0192528 | A1 * | 8/2012 | Ansaloni | G01G 17/00 53/266.1 |
| 2015/0175273 | A1 * | 6/2015 | Miyoshi | B64C 13/0421 340/963 |
| 2015/0175279 | A1 * | 6/2015 | Heinrich | B30B 1/18 53/438 |
| 2016/0089302 | A1 * | 3/2016 | Scheffler | B65B 3/003 53/284.5 |
| 2018/0161244 | A1 * | 6/2018 | Lopez | A61M 5/16845 |
| 2019/0029922 | A1 * | 1/2019 | Tagliavini | G01G 17/00 |
| 2022/0218567 | A1 * | 7/2022 | Singh | B65B 1/04 |

* cited by examiner

SMART TAMPING SYSTEM FOR DOSAGE OPTIMIZATION IN CAPSULE FILLING MACHINE

TECHNICAL FIELD

The present disclosure relates to capsule filling machines. More particularly, the present disclosure relates to tamping systems used in capsule filling machines.

BACKGROUND

Background description includes information that may be useful in understanding the present invention. It is not an admission that any of the information provided herein is prior art or relevant to the present invention, or that any publication specifically or implicitly referenced is prior art.

Manufacturing of solid oral dosage forms such as capsules involves various pharmaceutical ingredients/powders brought together through a step-by-step process. A series of steps are carried out in various types of equipment for feeding different ingredients such as active pharmaceutical ingredients (APIs), excipients, Nutraceutical ingredients, dietary supplements, but not limited to the likes. in different feeders, mixing the ingredients in a blender, and filling capsules with the mixture of the APIs and excipients in a capsule filling machine to produce capsules containing dosage of a desired quantity.

Various embodiments of the present disclosure elaborate upon a tamping system for capsule filling machines for filling active pharmaceutical ingredients (APIs). However, the present invention is not just limited to tamping or filling of APIs, and are applicable to Nutraceutical ingredients, dietary supplements, but not limited to the likes, and all such embodiments are well within the scope of the present invention.

Most capsule filling machines typically comprise an assembly of different components for feeding empty capsules, automatically orienting the empty capsules in a predetermined orientation and separating a cap and a body of each capsule, filling one or more pharmaceutical ingredients/powders in each capsule body, closing the cap and the body of each capsule to form filled capsules, ejecting the filled capsules, and optionally checking the filled capsules for compliance with predefined quality parameters and rejecting the capsules not complying with the predefined quality parameters.

Filling the body of the capsules with pharmaceutical ingredients is carried out by a tamping process where the pharmaceutical ingredient is compressed a number of times before being filled in the body of each capsule. The tamping process is typically involves progressively compressing small quantities of the pharmaceutical ingredient in a dosing disc by tamping pistons, that leads to a slug being formed in the dosing disc which is then pushed out of the dosing disc and filled in the body of each empty capsule held in an empty capsule segment of the capsule filling machine.

European Patent Document Number EP3295920A1 discloses a capsule filling machine comprising a transfer turret arranged to transfer the capsules through successive operating stations, including at least one dosing station arranged to fill capsule bodies of the capsules with a product and comprising a dosing turret and a first dosing unit mounted on the dosing turret. The first dosing unit comprises a dosing cylinder and a piston movable within the dosing cylinder at least between a first internal position (D), wherein it forms within the dosing cylinder, a dosing chamber for holding a product dose (P1), and an ejection position (E) to push the product dose (P1) out of the dosing cylinder to a respective capsule body. The machine includes a first electrical linear actuator associated with the dosing turret and suitable for moving the piston of the first dosing unit between said first internal position (D) and said ejection position (E).

United States Patent Document Number US20150175279A1 discloses a tamping punch station for filling capsules in a capsule filling machine. The machine includes a rotatably drivable dosing disk with bore holes and a filling device for filling the bore holes. Tamping punches and ejection punches are held on a punch support, and vertical movement of the punch support causes the tamping punches to press filling material into the bore holes and the ejection punches to eject pellets created by the tamping punches in the bore holes. First drive means rotates the dosing disk along punches and second drive means moves the punch support. The second drive means comprises at least two spindle drives acting on the punch support with respectively one spindle nut and respectively one vertical drive spindle guided in the spindle nut and at least two drive motors, which drive respectively one of the spindle drives for vertical movement of the punch support.

However, in the above cited prior art documents, during tamping process, the slug is pushed out of the dosing disc to be filled in the body of each capsule irrespective of the presence/absence of an empty capsule body in the empty capsule segment to receive the slug. Even if the empty capsule body is absent in the segment, the slug will still be delivered resulting wastage of the pharmaceutical ingredient/slug. Such wastage of pharmaceutical ingredient/slug can lead to significant economic loss to a pharmaceutical capsule manufacturing company. Furthermore, the wasted pharmaceutical ingredient/slug cannot be reused which leads to deterioration of the overall yield of the capsule filling machine.

Furthermore, in the absence of the empty capsule body in the segment, the slug which is pushed out of the dosing disc, will fall down in the capsule filling machine typically in a tray kept below the machine. As the slug falls down from a height, it breaks into dust and creates dusting in the machine which can choke up different components of the machine if not cleaned regularly. Cleaning up the dust created in the machine requires the operation of the machine to be halted, and frequent halting of the machine can lead to further economic losses to the pharmaceutical capsule manufacturing company.

Generally, the weight of filled capsules exiting the capsule filling machine is used as a parameter to influence the operation and control of tamping pistons. To ensure that the filled capsule is of pre-defined weight and quality, the tamping pistons are controlled to generate a higher/lower amount of tamping force to achieve a higher/lower compression level of the pharmaceutical ingredient in the dosing disc. However, in conventional tamping process, the operation of a pre-designated set of tamping pistons is controlled to generate a higher/lower amount of tamping force, thereby restricting the full scale utilization of the tamping pistons to achieve a desired level of compression of the pharmaceutical ingredient to ensure that the filled capsules are of a predefined weight.

There is therefore felt a need for a tamping process and mechanism that prevents wastage of pharmaceutical ingredient/slug to optimize the dosage to filled in empty capsules, and also ensures that each capsule exiting the capsule filling machine is of a pre-defined weight and quality.

OBJECTS OF THE PRESENT DISCLOSURE

Some of the objects of the present disclosure, which at least one embodiment herein satisfies are as listed herein below.

An object of the present disclosure is to provide a smart tamping system that optimizes the dosage of a pharmaceutical ingredient/slug to be filled in empty capsules in a capsule filling machine.

Another object of the present disclosure is to provide a smart tamping system that prevents wastage of a pharmaceutical ingredient/slug being filled in empty capsules in capsule filling machine.

Another object of the present disclosure is to provide a smart tamping system that increases overall yield of the capsule filling machine.

Another object of the present disclosure is to provide a smart tamping system that is capable of generating tamping force as per a desired level of compression of a pharmaceutical ingredient.

Another object of the present disclosure is to provide a smart tamping system which ensures that each capsule exiting the capsule filling machine is of a pre-defined weight and quality.

Another object of the present disclosure is to provide a smart tamping system that decreases dusting in the capsule filling machine.

SUMMARY

The present disclosure relates to capsule filling machines. More particularly, the present disclosure relates to smart tamping systems used in capsule filling machines.

An aspect of the present disclosure pertains to a tamping system for a capsule filling machine. The tamping system comprising a dosing disc provided with a plurality of first holes, and adapted to get at least partially covered with a filler material to be tamped. The system further comprising one or more holder blocks positioned above the dosing disc, where each of the one or more holder blocks comprises a set of tamping pistons, and are configured to move between a first position and a second position. The first position corresponds to a lifted position where the set of tamping pistons are at a predefined height above the dosing disc, and the second position corresponds to a lowered position such that the set of tamping pistons are at least partially disposed in the plurality of first holes. Further, the system comprises one or more actuators operatively coupled to one or more tamping pistons associated with the set of tamping pistons corresponding to each of the one or more holder blocks. The actuation of the one or more actuators restricts the movement of the corresponding tamping pistons into respective first holes of the dosing disc.

In an aspect, the tamping system may comprise a control unit operatively coupled to a set of first sensors associated with the capsule filling machine. The set of first sensors may be configured to detect, at least at one station of the capsule filling machine, absence of one or more capsule caps or capsule bodies in capsule holders associated with a turret of the capsule filling machine, and may correspondingly transmit a set of first signals to the control unit.

In an aspect, the control unit upon receiving the set of first signals, may transmit a set of first control signal to the one or more actuators to restrict the movement of the one or more tamping pistons into corresponding first holes that align with holes of the empty capsule holders of the turret.

In an aspect, the one or more actuators, based on the received set of first control signals, may restrict movement of the one or more tamping pistons into the corresponding first holes for a predefined rotational cycle of the dosing disc.

In an aspect, the tamping system may comprise: a tamping plate which may be configured to accommodate the one or more holder blocks, and one or more actuator housings coupled to the tamping plate that may be configured to accommodate the one or more actuators.

In an aspect, the one or more actuator housings may be coupled to the tamping plate by means of one or more height adjustment screws. The one or more height adjusting screws may be configured to adjust height of the one or more actuator housings, the one or more holder blocks, and the set of tamping pistons, above the dosing disc.

In an aspect, the tamping system may comprise a first driving unit operatively coupled to the tamping plate, and may be configured to move the tamping plate and the one or more holding blocks between the first position and the second position.

In an aspect, the control unit may be configured to transmit a set of second control signals to any or a combination of the first driving unit, and the one or more actuators to control tamping parameters of the set of tamping pistons.

In an aspect, the tamping system may comprise a set of second sensors configured with the capsule filling machine, and may be adapted to monitor weight of the filler material filled in the one or more capsule caps, and correspondingly transmit a set of second signals to the control unit when the weight of the filler material in the one or more capsule caps is beyond a predetermined weight. The control unit may be configured to transmit the set of second control signals to any or a combination of the first driving unit and the one or more actuators to control the tamping parameters of the set of tamping pistons based on the monitored weight of the filler material in the one or more capsule caps.

In an aspect, the tamping system may comprise a second driving unit operatively coupled to the dosing disc, and may be configured to control rotational parameters of the dosing disc.

In an aspect, the dosing disc may be configured to rotate by a predetermined angle when the set of the tamping pistons moves from the second position to the first position. The dosing disc may be configured to stop rotating when the set of the tamping pistons moves from the first position to the second position.

In an aspect, the tamping system may comprise a first plate positioned below the dosing disc, and abutting to a bottom surface of the dosing disc to restrict movement of the filler material from the plurality of first holes. The first plate may be fixed, and the dosing disc may be configured to rotate above the first plate.

In an aspect, at least a section of the first plate may be sliced out to allow movement of the filler material through first holes of the dosing disc corresponding to the sliced section of the first plate.

In an aspect, the movement of the set of tamping pistons towards the second position when a non-sliced section of the first plate is below the dosing disc facilitates compression of the filler material in the corresponding first holes to form a slug. Further, the movement of the set of tamping pistons towards the second position when the sliced section of the first plate is below the dosing disc allows any or a combination of the filler material, and the slug to discharge through the corresponding first holes.

In an aspect, the tamping system may comprise one or more sliding plates provided with a plurality of second holes and may be configured to move between a third position and a fourth position. The third position may correspond to a closed position where a bottom end of the plurality of first holes are closed by the one or more sliding plates.

In an aspect, the fourth position may correspond to an opened position where the plurality of second holes are aligned with the plurality of first holes and allows any or a combination of the filler material, and the slug to discharge through the corresponding first holes and the second holes.

In an aspect, the movement of the set of tamping pistons towards the second position when the one or more sliding plates are in the third position may facilitate compression of the filler material in the corresponding first holes to form a slug. The movement of the set of tamping pistons towards the second position when the one or more sliding plates are in the fourth position may allow any or a combination of the filler material, and the slug to discharge through the corresponding first holes and the second holes.

In an aspect, the tamping system may comprise a third driving unit operatively coupled to the one or more sliding plates and may be configured to facilitate movement of the one or more sliding plates between the third position and the fourth position.

In an aspect, each of the one or more actuators may comprise a pneumatic cylinder operatively coupled to the corresponding tamping pistons.

In an aspect, the one or more actuators may be selected from a group comprising any or a combination of electromagnetic actuators, electric actuator, hydraulic actuator, spring-based actuators, and electromechanical actuators.

BRIEF DESCRIPTION OF ACCOMPANYING DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION

Figure 1A:
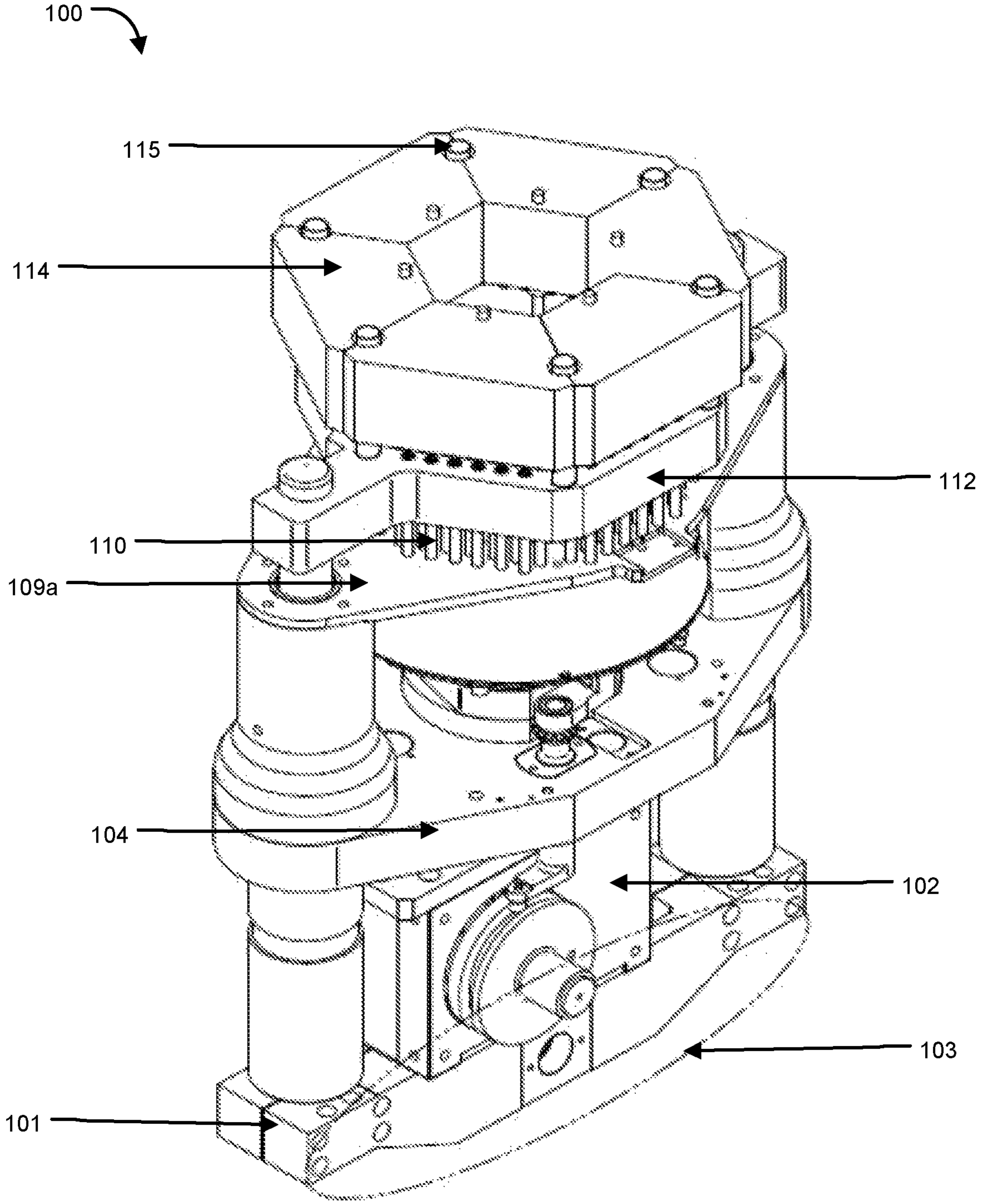
FIGS. 1A-1D show perspective views illustrating exemplary first embodiment of a smart tamping system for dosage optimization in a capsule filling machine, in accordance with the present disclosure.
Figure 1B:
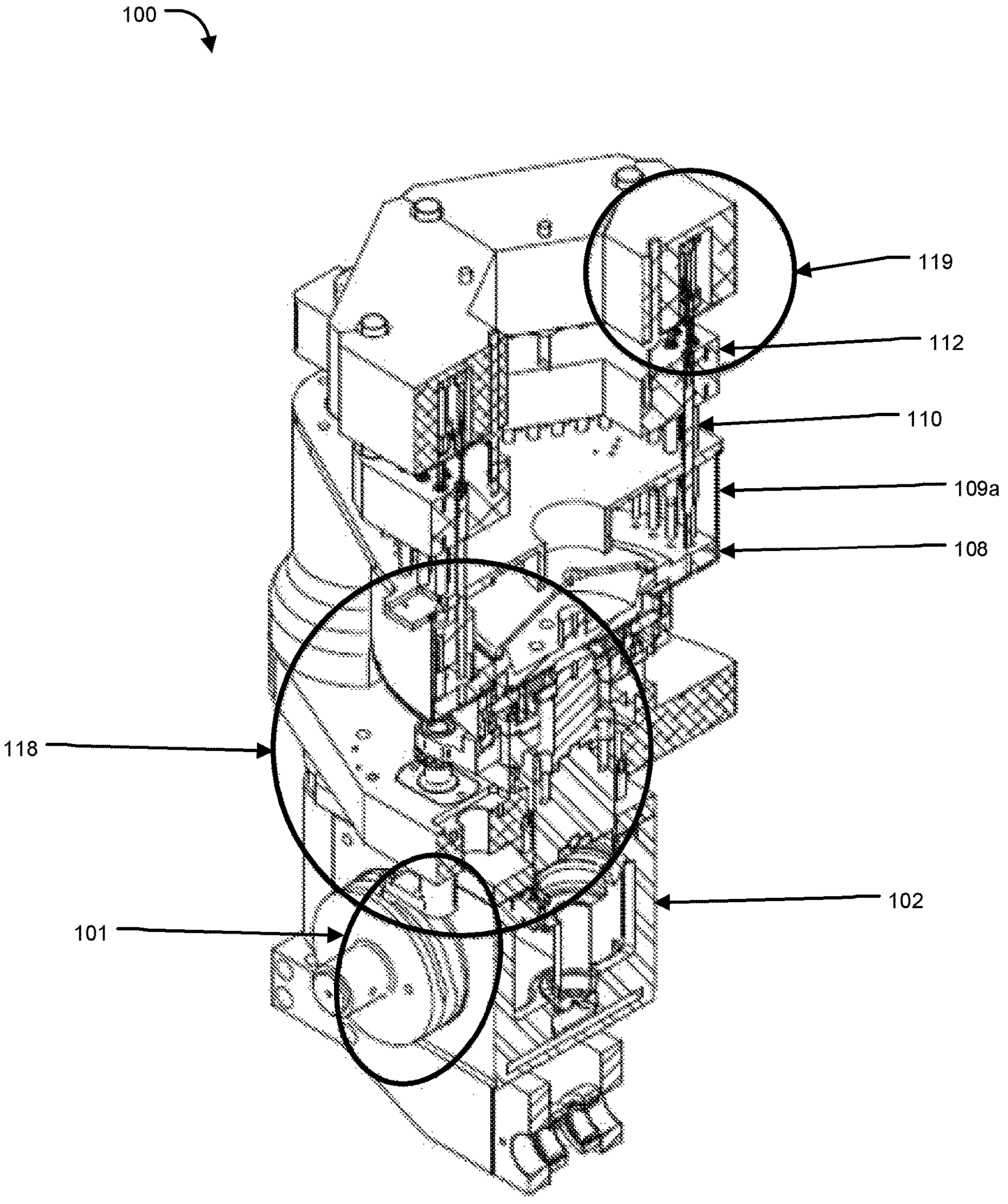
Figure 1C:
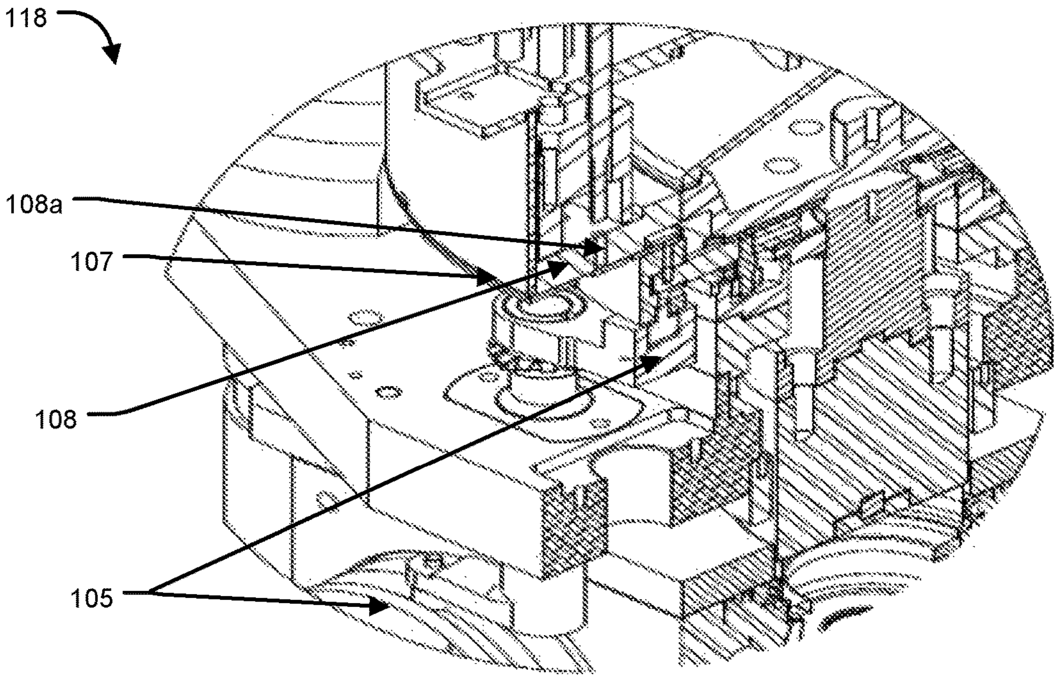
Figure 1D:
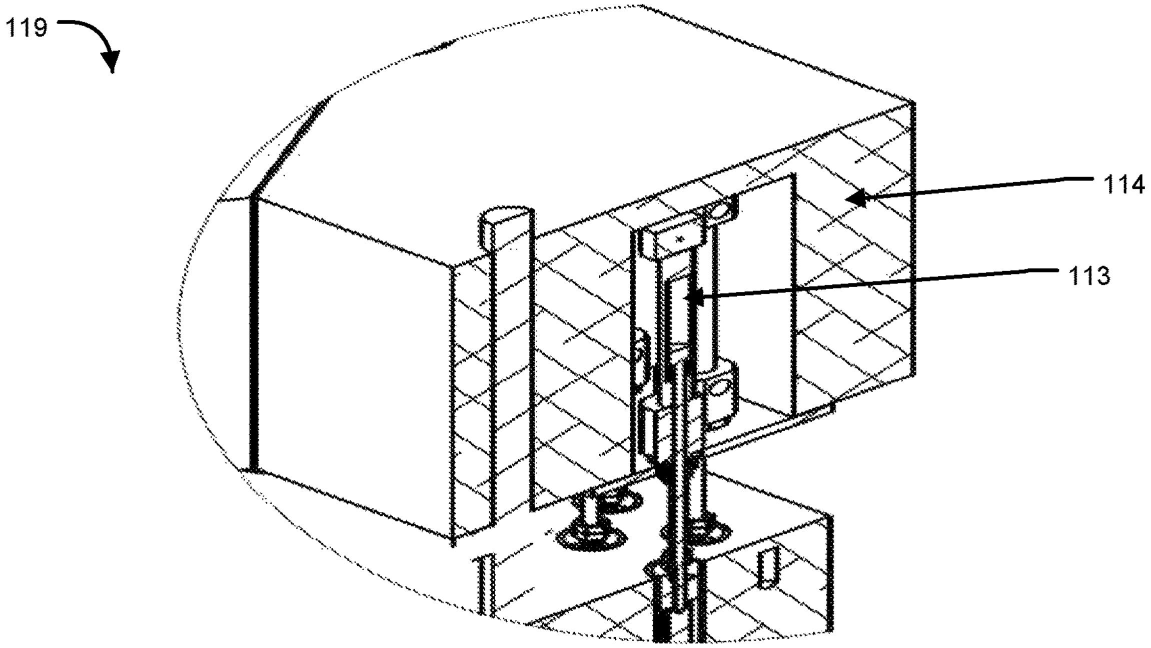
Figure 1E:
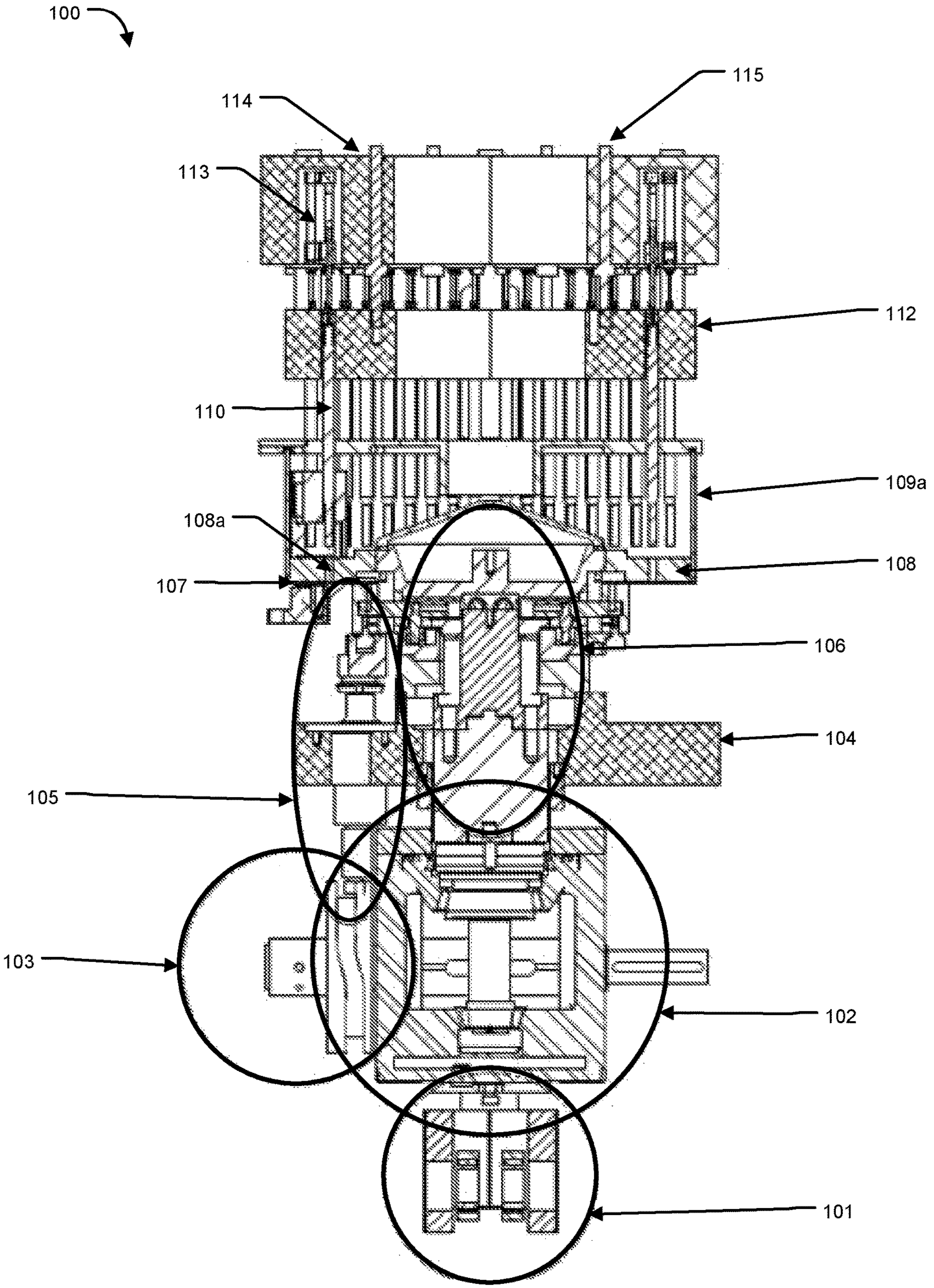
FIG. 1E shows a sectional view of the first embodiment of the smart tamping system as illustrated in FIG. 1A.
Figure 1F:
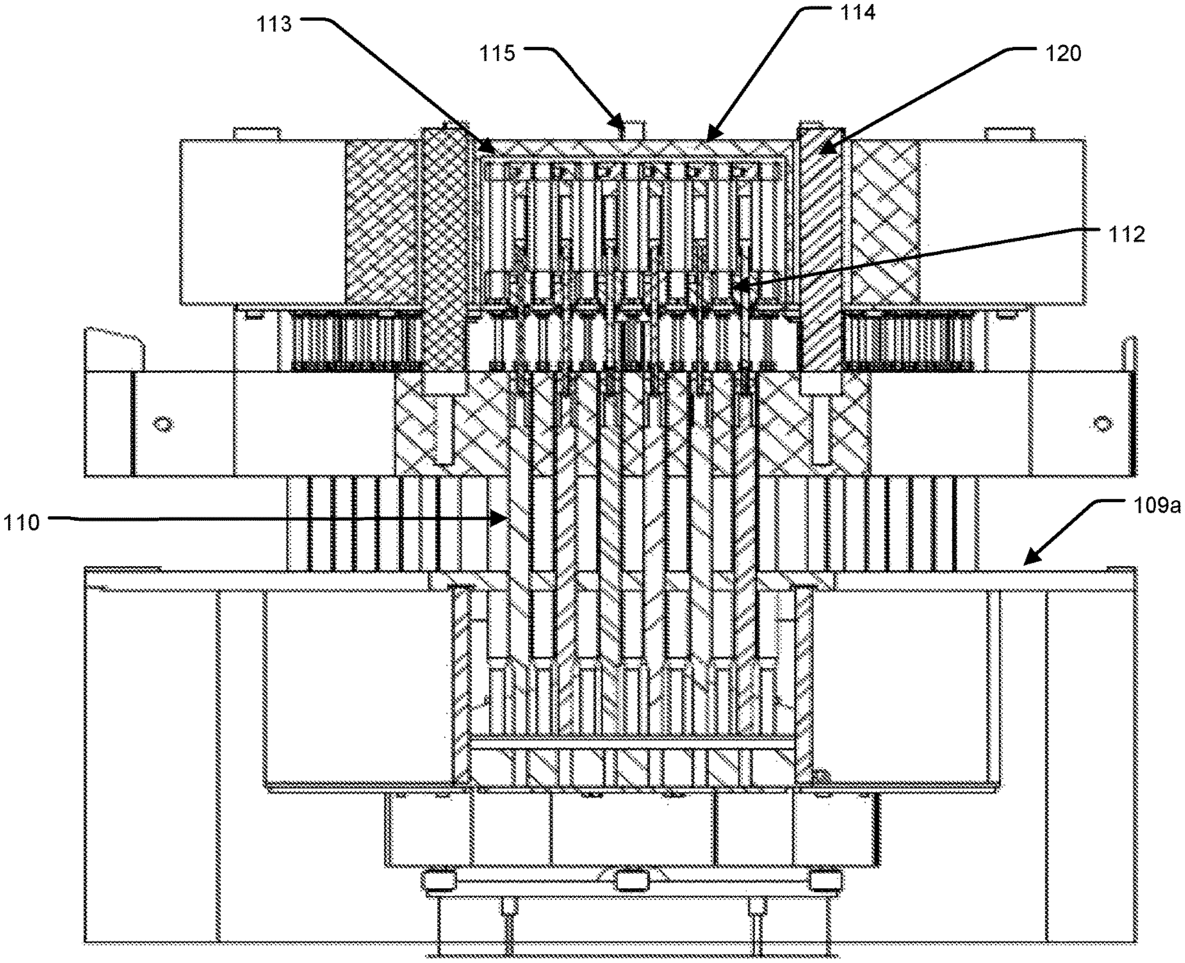
FIG. 1F shows a sectional view of a top portion of the smart tamping system as illustrated in the sectional view shown in FIG. 1A.
Figure 2A:
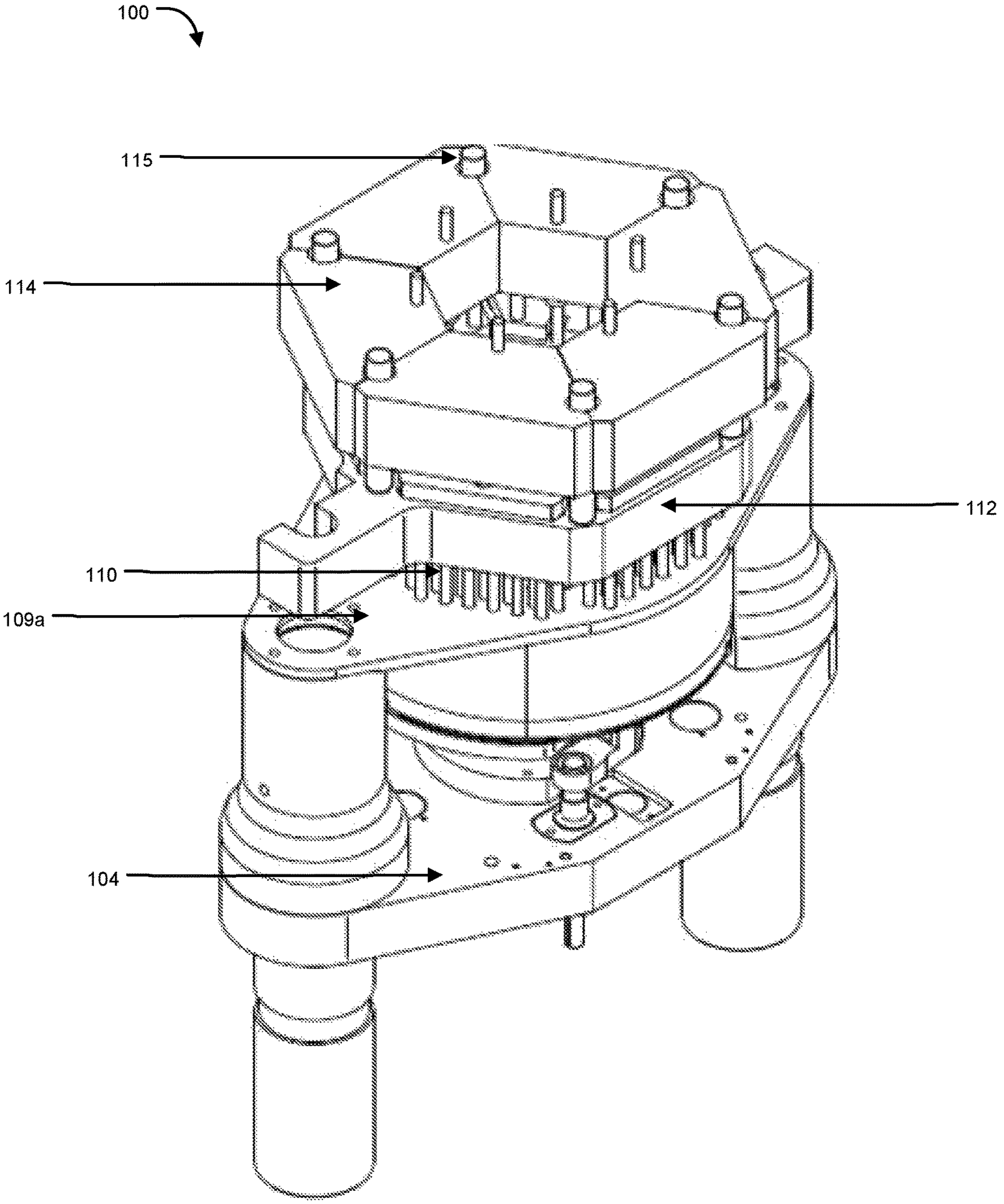
FIGS. 2A-2C show perspective views illustrating exemplary second embodiment of the smart tamping system for dosage optimization in a capsule filling machine, in accordance with the present disclosure.
Figure 2B:
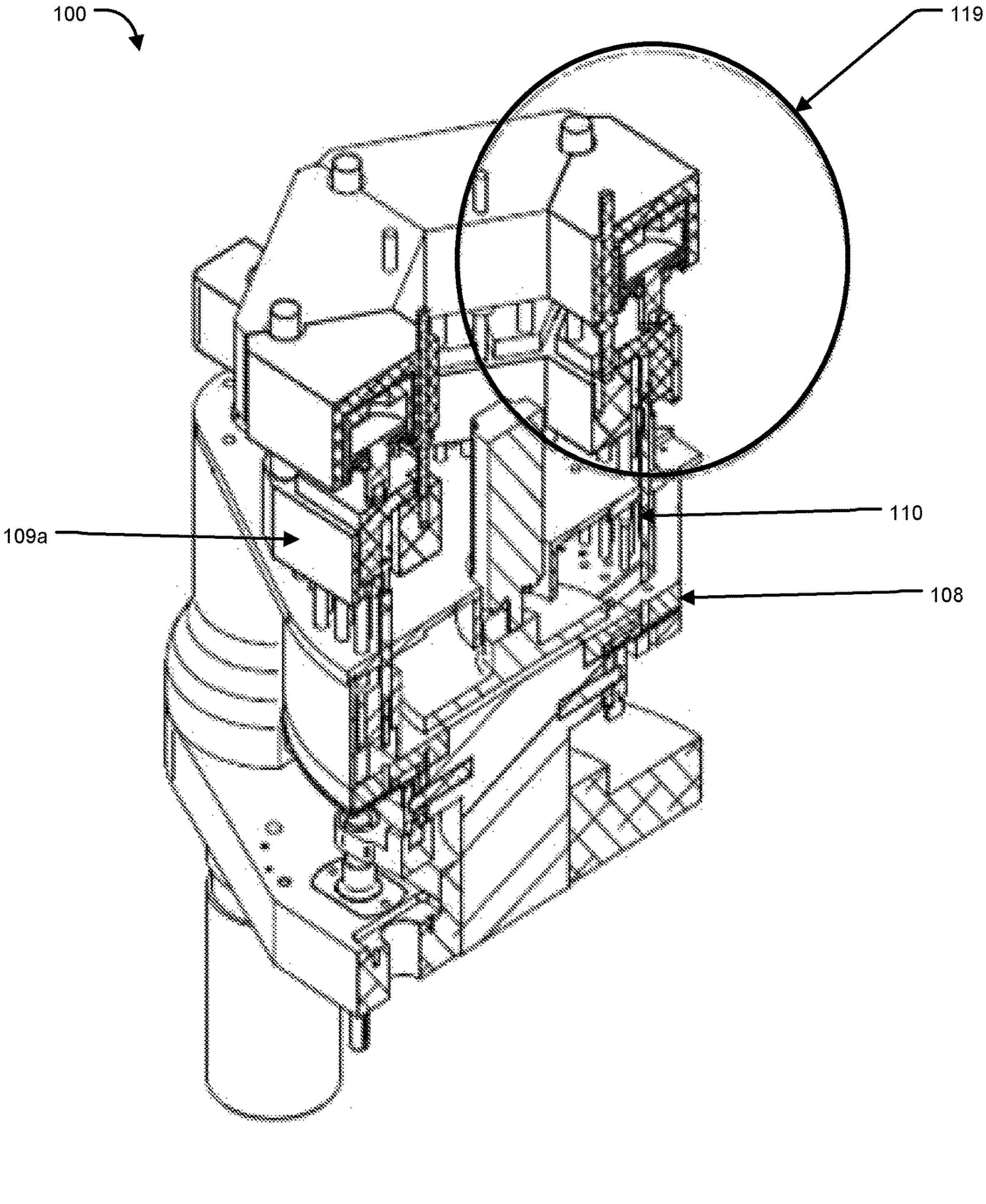
Figure 2C:
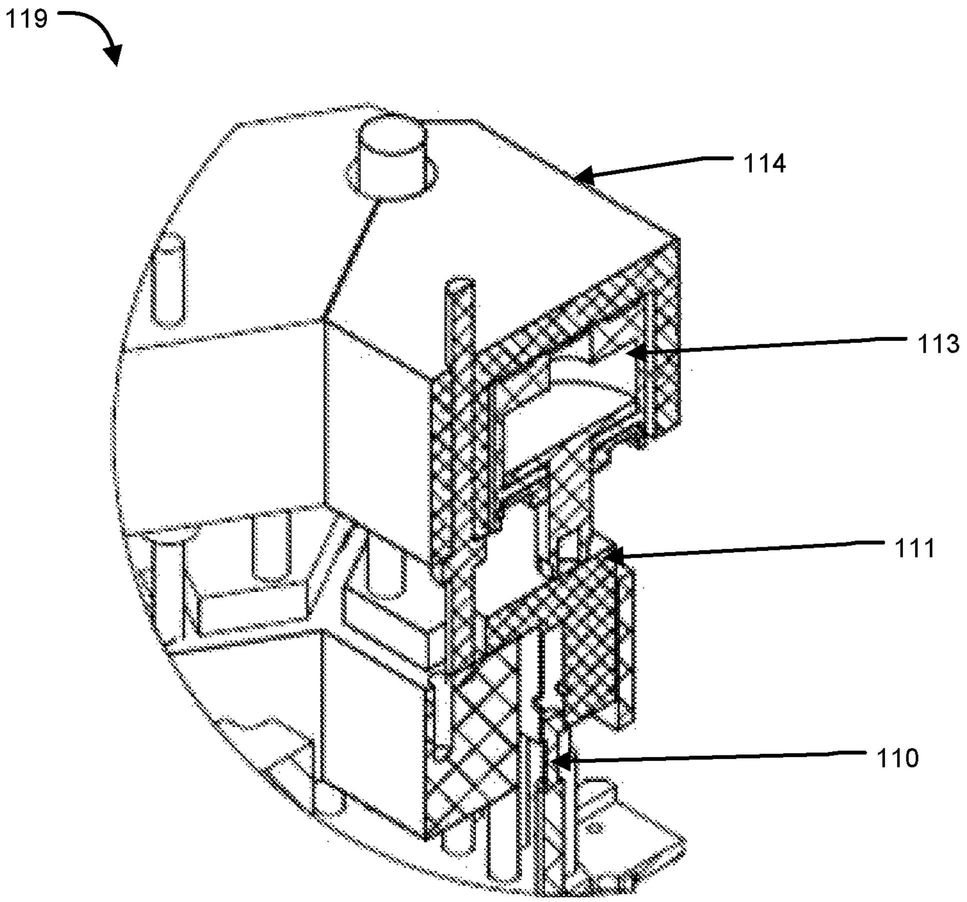
Figure 2D:
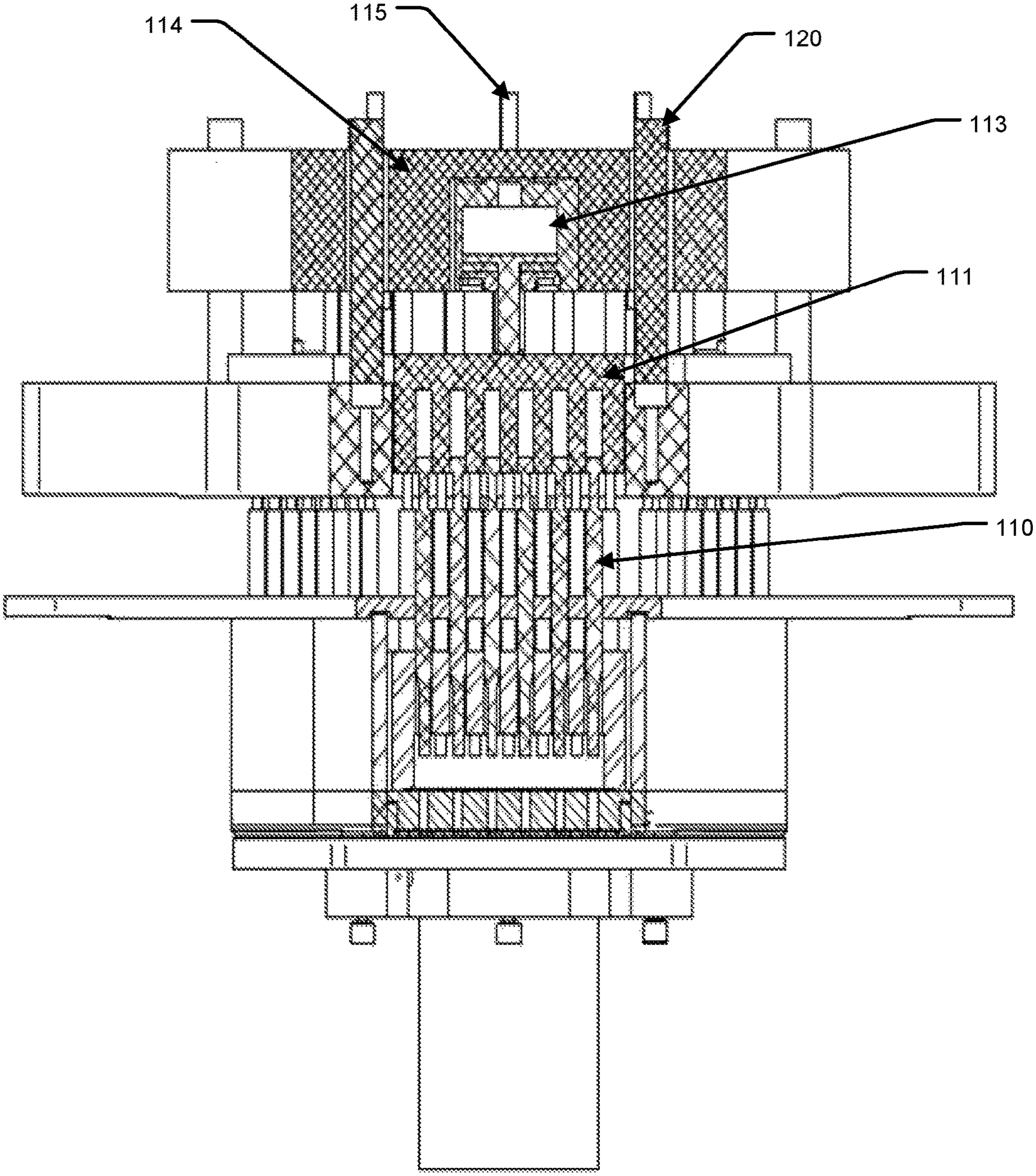
FIG. 2D shows a sectional view of a top portion of the smart tamping system as illustrated in the sectional view shown in FIG. 2A.

The following is a detailed description of embodiments of the invention disclosed herein. The embodiments are in such details as to clearly communicate the invention. However, the amount of details offered is not intended to limit the anticipated variations of embodiments; on the contrary, the intention is to cover all modifications, equivalents, and alternatives falling within the spirit and scope of the present invention.

Unless the context requires otherwise, throughout the specification which follow, the word "comprise" and variations thereof, such as, "includes" and "comprising" are to be construed in an open, inclusive sense that is as "including, but not limited to."

Reference throughout this specification to "an exemplary embodiment", "one embodiment" or "an embodiment" means that a particular feature, structure or characteristic described in connection with the embodiment is included in at least one embodiment. Thus, the appearances of the phrases "in exemplary embodiment", "in one embodiment" or "in an embodiment" in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference will now be made in detail to the exemplary embodiments of the present invention, examples of which are illustrated in the accompanying drawings. Wherever possible, the same reference numbers are used in the drawings and the description to refer to the same or like parts.

The following discussion provides many example embodiments of the inventive subject matter. Although each embodiment represents a single combination of inventive elements, the inventive subject matter is considered to include all possible combinations of the disclosed elements. Thus, if one embodiment includes elements A, B, and C, and a second embodiment includes elements B and D, then the inventive subject matter is also considered to include other remaining combinations of A, B, C, or D, even if not explicitly disclosed.

According to an aspect, the present disclosure elaborates a smart tamping system for dosage optimization in a capsule filling machine. The tamping system including a dosing disc provided with a plurality of first holes, and adapted to get at least partially covered with a filler material to be tamped. The system further including one or more holder blocks positioned above the dosing disc, where each of the one or more holder blocks includes a set of tamping pistons, and are configured to move between a first position and a second position. The first position corresponds to a lifted position where the set of tamping pistons are at a predefined height above the dosing disc, and the second position corresponds to a lowered position such that the set of tamping pistons are at least partially disposed in the plurality of first holes. Further, the system includes one or more actuators operatively coupled to one or more tamping pistons associated with the set of tamping pistons corresponding to each of the one or more holder blocks. The actuation of the one or more actuators restricts the movement of the corresponding tamping pistons into respective first holes of the dosing disc.

In an embodiment, the tamping system can include a control unit operatively coupled to a set of first sensors associated with the capsule filling machine. The set of first sensors can be configured to detect, at least at one station of the capsule filling machine, absence of one or more capsule caps and/or capsule bodies in capsule holders associated with a turret of the capsule filling machine, and can correspondingly transmit a set of first signals to the control unit.

In an embodiment, the control unit upon receiving the set of first signals, can transmit a set of first control signal to the one or more actuators to restrict the movement of the one or more tamping pistons into corresponding first holes that align with holes of the empty capsule holders of the turret.

In an embodiment, the one or more actuators, based on the received set of first control signals, can restrict movement of the one or more tamping pistons into the corresponding first holes for a predefined rotational cycle of the dosing disc.

In an embodiment, the tamping system can include: a tamping plate which can be configured to accommodate the one or more holder blocks, and one or more actuator housings coupled to the tamping plate that can be configured to accommodate the one or more actuators.

In an embodiment, the one or more actuator housings can be coupled to the tamping plate by means of one or more height adjustment screws. The one or more height adjusting screws can be configured to adjust height of the one or more actuator housings, the one or more holder blocks, and the set of tamping pistons, above the dosing disc.

In an embodiment, the tamping system can include a first driving unit operatively coupled to the tamping plate, and can be configured to move the tamping plate and the one or more holding blocks between the first position and the second position.

In an embodiment, the control unit can be configured to transmit a set of second control signals to any or a combination of the first driving unit, and the one or more actuators to control tamping parameters of the set of tamping pistons.

In an embodiment, the tamping system can include a set of second sensors configured with the capsule filling machine, and can be adapted to monitor weight of the filler material filled in the one or more capsule caps, and correspondingly transmit a set of second signals to the control unit when the weight of the filler material in the one or more capsule caps is beyond a predetermined weight. The control unit can be configured to transmit the set of second control signals to any or a combination of the first driving unit and the one or more actuators to control the tamping parameters of the set of tamping pistons based on the monitored weight of the filler material in the one or more capsule caps.

In an embodiment, the tamping system can include a second driving unit operatively coupled to the dosing disc, and can be configured to control rotational parameters of the dosing disc.

In an embodiment, the dosing disc can be configured to rotate by a predetermined angle when the set of the tamping pistons moves from the second position to the first position. The dosing disc can be configured to stop rotating when the set of the tamping pistons moves from the first position to the second position.

In an embodiment, the tamping system can include a first plate positioned below the dosing disc, and abutting to a bottom surface of the dosing disc to restrict movement of the filler material from the plurality of first holes. The first plate can be fixed, and the dosing disc can be configured to rotate above the first plate.

In an embodiment, at least a section of the first plate can be sliced out to allow movement of the filler material through first holes of the dosing disc corresponding to the sliced section of the first plate.

In an embodiment, the movement of the set of tamping pistons towards the second position when a non-sliced section of the first plate is below the dosing disc facilitates compression of the filler material in the corresponding first holes to form a slug. Further, the movement of the set of tamping pistons towards the second position when the sliced section of the first plate is below the dosing disc allows any or a combination of the filler material, and the slug to discharge through the corresponding first holes.

In an embodiment, the tamping system can include one or more sliding plates provided with a plurality of second holes and can be configured to move between a third position and a fourth position. The third position can correspond to a closed position where a bottom end of the plurality of first holes are closed by the one or more sliding plates.

In an embodiment, the fourth position can correspond to an opened position where the plurality of second holes are aligned with the plurality of first holes and allows any or a combination of the filler material, and the slug to discharge through the corresponding first holes and the second holes.

In an embodiment, the movement of the set of tamping pistons towards the second position when the one or more sliding plates are in the third position can facilitate compression of the filler material in the corresponding first holes to form a slug. The movement of the set of tamping pistons towards the second position when the one or more sliding plates are in the fourth position can allow any or a combination of the filler material, and the slug to discharge through the corresponding first holes and the second holes.

In an embodiment, the tamping system can include a third driving unit operatively coupled to the one or more sliding plates and can be configured to facilitate movement of the one or more sliding plates between the third position and the fourth position.

In an embodiment, each of the one or more actuators can include a pneumatic cylinder operatively coupled to the corresponding tamping pistons.

In an embodiment, the one or more actuators can be selected from a group including any or a combination of electromagnetic actuators, electric actuator, hydraulic actuator, spring-based actuators, and electromechanical actuators.

Referring to FIGS. 1A-2D, a smart tamping system (100) (also referred to as tamping system 100, herein) for dosage optimization a capsule filling machine in accordance an exemplary embodiment is illustrated. The tamping system (100) can include a dosing disc (108) provided with a plurality of first holes 108*a* (also referred to as first holes or through-holes, herein), and adapted to get at least partially covered with a filler material to be tamped. The system (100) can further include one or more holder blocks (111) (also referred to as holder blocks (111), herein) positioned above the dosing disc (108). Each of the holder blocks (111) can include a set of tamping pistons (110), which are configured to move between a first position and a second position. The first position can correspond to a lifted position where the set of tamping pistons (110) are at a predefined height above the dosing disc, and the second position can correspond to a lowered position such that the set of tamping pistons (110) are at least partially disposed in the plurality of first holes 108*a*. The dosing disc (108) can be configured to rotate by a predetermined angle when the set of the tamping pistons (110) moves from the second position to the first position, and further, the dosing disc (108) can be configured to stop rotating when the set of the tamping pistons (110) moves from the first position to the second position.

In an embodiment, the tamping system (100) can include a first plate (107) positioned below the dosing disc (108), and abutting to a bottom surface of the dosing disc (108) to restrict movement of the filler material from the plurality of first hole (108*a*). In an exemplary embodiment, the first plate (107) can be fixed, and the dosing disc (108) can be configured to rotate above the sliding plate (107). Further, at least a section of the first plate (107) can be sliced out to allow movement of the filler material through first holes of the dosing disc (108) corresponding to the sliced section of the first plate (107). The movement of the set of tamping pistons (110) towards the second position when a non-sliced section of the first plate (107) is below the dosing disc (108) can facilitate compression of the filler material in the corresponding first holes to form a slug. Further, the movement of the set of tamping pistons (110) towards the second position when the sliced section of the first plate (107) is below the dosing disc (108) can allow any or a combination of the filler material, and the slug to discharge through the corresponding first holes.

In another embodiment, the tamping system (100) can include one or more sliding plates (107) (also referred to as sliding plates, herein) provided with a plurality of second holes and configured to move between a third position and a fourth position. The third position can correspond to a closed position where a bottom end of the plurality of first holes of the dosing disc (108) are closed by the sliding plates (107). The fourth position can correspond to an opened position where the plurality of second holes of the sliding plate (107) are aligned with the plurality of first holes of the dosing disc (108) and allows any or a combination of the filler material, and the slug to discharge through the corresponding first holes and the second holes. The movement of the set of tamping pistons (110) towards the second position when the sliding plates (107) are in the third position can facilitate compression of the filler material in the corresponding first holes to form the slug, Further, the movement of the set of tamping pistons (110) towards the second position when the sliding plates (107) are in the fourth position can allow any or a combination of the filler material, and the slug to discharge through the corresponding first holes and the second holes.

In an embodiment, the tamping system (100) can include one or more actuators (113) (also referred to as actuators, herein) operatively coupled to tamping pistons (110) associated with the set of tamping pistons corresponding to each of the holder blocks (111). The actuation of the actuators (113) can restrict the movement of the corresponding tamping pistons (110) into respective first holes of the dosing disc, irrespective of the movement of the holder blocks (111) towards the lowered position. In an exemplary embodiment, the actuators (113) can be selected from any or a combination of pneumatic actuators, electromagnetic actuators, electric actuator, hydraulic actuator, spring-based actuators, and electromechanical actuators, but not limited to the likes.

A capsule filling machine typically comprises a turret in the form of a turn-table which rotates through a plurality of stations each with an assembly of different components for loading empty capsules; automatically orienting the empty capsules in a predetermined orientation where a cap of each capsule is on top and a body of each capsule is below the cap, and separating the cap and the body of each capsule; checking and confirming the presence of the cap of each capsule; filling one or more pharmaceutical ingredients in each capsule body; closing the cap and the body of each capsule to form filled capsules, ejecting the filled capsules, and optionally checking the filled capsules for compliance with predefined quality parameters and rejecting the capsules not complying with the predefined quality parameters.

Filling of one or more filler materials such as pharmaceutical ingredients in capsules is carried out at a filling/tamping station by a tamping process that typically is carried out by the tamping system. Small quantities of pharmaceutical ingredients are compressed by each set of tamping pistons in the dosing disc, such that after multiple progressive compressions the slug is formed in the dosing disc which can then pushed out of the dosing disc and filled in the body of each capsule held in the empty capsule body holder, which are positioned below the dosing disc.

However, in conventional tamping process/mechanism as cited in the Background section, the slug is pushed out of the dosing disc to be filled in the body of each capsule irrespective of the presence/absence of an empty capsule body in an empty capsule segment in the turret of the capsule filling machine to receive the slug. Even if the empty capsule body is absent, the slug will still be pushed out of the dosing disc resulting wastage of the pharmaceutical ingredient/slug. Such wastage of pharmaceutical ingredient/slug can lead to significant economic loss to a pharmaceutical capsule manufacturing company. Moreover, the wasted pharmaceutical ingredient/slug cannot be reused which also lead to deterioration of the overall yield of the capsule filling machine.

To overcome the aforementioned problems of conventional tamping mechanisms, the tamping system of the present disclosure provides selective delivery of the pharmaceutical ingredient slug, i.e. pushed out of the dosing disc of the capsule filling machine based on the presence/absence of one or more empty capsule bodies in an empty capsule segment in a turret of the capsule filling machine.

In an implementation, based on the presence/absence of one or more empty capsule bodies in the empty capsule segment in the turret of the capsule filling machine, the tamping system (100) enables actuation of the actuators (113) which can restrict the movement of the tamping pistons (110) into the respective first holes (of the dosing disc 108) that are configured to be aligned with the empty capsule segments of the turret where no capsule bodies were identified or present, irrespective of the movement of the holder blocks (111) towards the lowered position, thereby restricting the delivery of the slug into empty capsule segment of the turret, and preventing wastage of the filler material or slug.

In the above implementation, the movement of the holder blocks (111) towards the lowered position allows rest of the tamping pistons (110) to move into their respective first holes that are configured to align with the empty capsule segments of the turret where capsule bodies are present, thereby facilitating delivery or pushing out of the slug in the capsule bodies. Further, only those tamping pistons (110) are restricted to move into their respective first holes which are configured to be aligned with the empty capsule segments of the turret where no capsule bodies were present, irrespective of the movement of the holder blocks (111) towards the lowered position.

In another implementation, the actuators (113) can further restrict the movement of all of the tamping pistons (110) into the corresponding first holes (of the dosing disc 108) through which no delivery of slug was allowed, for a predefined rotational cycle of the dosing disc until the same first holes again align with the empty capsule segment of the turret having the empty capsule bodies present on them. This restriction of movement of all the tamping pistons (110) into the corresponding first holes for the predefined rotational cycle of the dosing disc can restrict undesired delivery or pushing out of the slug by the tamping pistons (110).

As illustrated in FIG. 1A-1F, in an embodiment, the actuators (113) of the tamping system can be pneumatic actuators comprising pneumatic cylinders (113). The tamping system (100) can include individual pneumatic cylinder (113) for each of the tamping pistons (110) such that the movement of each of the tamping pistons (110) can be controlled individually. This arrangement can facilitate restricting movement of only those tamping pistons into their respective first holes which are configured to be aligned with the empty capsule segments of the turret where no capsule bodies were present, irrespective of the movement of the holder blocks (111) towards the lowered position or the movement of other tamping pistons into other first holes.

As illustrated in FIG. 2A-2D, in another embodiment, the tamping system (100) can include individual pneumatic cylinder (113) for each set of the tamping pistons corresponding to each of the holding blocks (111) such that the movement of group the tamping pistons (110) corresponding to an individual set of tamping pistons can be controlled together. This arrangement can also facilitate restricting movement of a complete group or set of tamping pistons (110) into their respective set of first holes which are configured to be align aligned with a set of empty capsule segments of the turret where no capsule bodies were present, irrespective of the movement of the holder blocks (111) towards the lowered position or the movement of other set of tamping pistons into other set of first holes.

Referring to FIGS. 1A-2D, in an embodiment, the tamping system (100) can include a tamping plate (112) configured to accommodate the holder blocks (111), and one or more cylinder housing (114) (also referred to as actuator housing 114, herein) coupled to the tamping plate (112), and configured to accommodate the pneumatic cylinders or actuators (113). In an embodiment, the tamping system can include a first drive unit (101) operatively connected to the tamping plate (112) to cause vertical reciprocating motion of the tamping plate (112) and the holder block (111) between the lifted position and the lowered position. The tamping system (100) can further include a second drive unit (102) operatively connected to tamping system turret parts (106) to cause intermittent rotational motion of the turret system turret parts (106). The tamping system (100) can include a third driving unit (103) operatively coupled to the sliding plates (107) and configured to facilitate movement of the sliding plates (107) between the third position and the fourth position.

The first drive unit (101) can be operatively connected to the tamping plate (112) by means of reciprocating shafts/rods (not particularly shown) to cause vertical reciprocating motion of the tamping plate (112). The second drive unit (102) can be operatively connected to tamping system turret parts (106) by means of mechanical clamping such as key, bolts, dowel pins, and the like to cause intermittent rotational motion of the turret system turret parts. Additionally, a Cam (not particularly shown) is also operatively coupled to the second drive unit (102) by means of mechanical clamping such as key, bolts, dowel pins, and the like. The Cam performs continuous circular motions about X-axis.

The third drive unit (103) can be in the form of a Cam-Follower arrangement to cause sliding of the slider plate (107). The third drive unit or the Cam-Follower arrangement can include a Follower placed within the groove of the Cam and further attached to the Cam-Follower Linkage (105). The Follower within the groove of the Cam reciprocates the circular motion of the Cam about the X-axis to cause corresponding linear motion of the Cam-Follower Linkage thereby causing sliding of the slider plate (107). In an exemplary embodiment, the third driving unit (103) can be positioned at any of the one or more tamping stations.

In an embodiment, the holding blocks (111) can include a set of guiding means to facilitate accommodation of the actuators (113) in the holding block (111), and facilitate movement of the actuators (113) during height adjustment by a height adjustment screw (115)

The tamping system (100) can include a tamping system support plate (104) which can be used as a housing for various support parts used in the tamping system (100). The tamping system turret parts (106) in addition to being connected to the second drive unit (102) can further be operatively clamped to the dosing disc (108) thereby transferring the intermittent rotational motion generated by the second drive unit (102) to the dosing disc (108). Furthermore, tamping system turret parts (106) can also prevent the pharmaceutical ingredient from leaking into the tamping system support plate (104) and/or to the drive units In an embodiment, the dosing disc (108) can be a circular disc comprising an equivalent number of elongated first holes (also referred to as the first holes 108*a* or through-holes, herein) therein corresponding to the number of tamping pistons (110) wherein the first holes are organized in sets corresponding to the sets of tamping pistons (110) housed in the holder blocks (111). The diameter of each first or through-hole in the dosing disc (108) can correspond to the diameter of each tamping piston (110). The pharmaceutical ingredient filled tub (109) can be positioned above the dosing disc (108) and a cover (109*a*) can be placed thereon to prevent the pharmaceutical ingredient/powder in the tub (109) from escaping. The slider plate (107) can be a thin plate positioned below the dosing disc (108) and abuts to a bottom surface of the dosing disc (108).

The slider plate (107), rotary dosing disc (108), and pharmaceutical ingredient filled tub (109) with cover (109*a*) can be positioned below the tamping pistons (110). The cover (109*a*) can also include a plurality of through-holes (also referred to as third set of holes, herein) each having a tamping piston passing there through into the pharmaceutical ingredient in the tub.

In an embodiment, the holder blocks (111) housing the tamping pistons (110) are accommodated and arranged in corresponding cavities formed in the tamping plate (112) whereby each tamping piston (110) after passing through each through-hole of the cover (109*a*) can be disposed in the pharmaceutical ingredient in the tub (109) such that a distal end of each tamping piston (110) gets positioned just above the dosing disc (108) in pharmaceutical ingredient filled tub (109). The dosing disc (108) can be rotated intermittently in a step-wise manner by the predetermined angle, typically in clock wise direction, by the second drive unit (102) to cyclically/sequentially align each set of through-holes of the dosing disc (108) immediately below each set of tamping pistons (110).

The vertical displacement of the reciprocating shaft/rods by the first drive unit (101) can cause vertical reciprocating motion of the tamping plate (112) thereby vertically displacing the holder blocks (111) including the tamping pistons (110) along the Z-axis. The timings of the vertical reciprocating motion of the tamping plate (112) and the intermittent rotational motion of the dosing disc (108) can be matched such that when the tamping plate (112) and thereby the tamping pistons (110) are lifted in upward vertical direction, the dosing disc (108) is rotated in a step to bring and align each set of through-holes therein immediately below each set of tamping pistons (110). Once the dosing disc (108) comes to a halt, the tamping plate (112) and thereby the tamping pistons (110) can be brought down at a particular speed to compress the pharmaceutical ingredient into the through-holes of the dosing disc (108). Thereafter the tamping plate (112) and thereby the tamping pistons (110) can again be lifted in upward vertical direction, the dosing disc (108) can again be rotated in a step to bring and align each set of through-holes therein immediately below each set of tamping pistons (110). Again, after the dosing disc (108) comes to a halt, the tamping plate (112) and thereby the tamping pistons (110) can be brought down at a particular speed to compress the pharmaceutical ingredient into the through-holes of the dosing disc (108). This cycle of step-wise rotation of the dosing disc (108), typically in clock wise direction, and compression of the pharmaceutical ingredient in the through-holes of the dosing disc can be carried out a finite number of times to progressively compress small quantities of the pharmaceutical ingredient in the through-holes in the dosing disc (108), that leads to a slug being formed in the dosing disc (108) which is then finally pushed out of the dosing disc (108) to be filled in the body of each empty capsule held in the empty capsule segment in the turret of the capsule filling machine.

In an implementation, the slider plate (107) positioned below the dosing disc (108) and abutting to the bottom surface of the dosing disc (108) can prevent the compressed pharmaceutical ingredient from escaping out of the through-holes in the dosing disc (108). While the slider plate (107) below the dosing disc (108) is generally circular, a portion equivalent to a last set of through-holes of the dosing disc (108) is sliced out from the slider plate (107) to facilitate pushing out of the slug from the dosing disc (108). As the turret rotates and stops at the smart tamping system, the empty capsule segment in the turret can be aligned adjacent to the sliced out portion of the slider plate (107) and below the last set of through-holes of the dosing disc (108) to receive the pushed out slug in the empty capsule bodies held in the holes of the empty capsule segment.

In an exemplary embodiment, the tamping plate (112) can be of hexagonal shape having six hexagonally arranged cavities to accommodate six holder blocks (111) each comprising a set of thirteen tamping pistons (110) housed therein. Accordingly, the tamping system (100) can include six sets/holder blocks (112) of thirteen tamping pistons (110) accommodated and hexagonally arranged in the cavities in the tamping plate (112). Similarly the cover (109*a*) on the pharmaceutical ingredient filled tub (109) and the dosing disc (108) each can include six sets of thirteen through-holes hexagonally oriented thereabout, and the dosing disc (108) can be rotated in a step-wise manner, typically in clockwise direction, in six steps by an angle of 60° in each step to cyclically/sequentially align each of the six set of holes below each of the six set of tamping pistons (110) in the six holder blocks (111). The cycle of 60° step-wise rotation of the dosing disc (108) and compression of the pharmaceutical ingredient in the through-holes of the dosing disc (108) can be carried out five times for five steps of 60° rotation of the dosing disc (108), i.e. the small quantities of the pharmaceutical ingredient are progressively compressed five times through five sets of through-holes in the dosing disc (108) that leads to a slug being formed in the dosing disc (108), and on the sixth step of 60° rotation of the dosing disc (108), the slug can be pushed out of the dosing disc (108) to be filled/delivered in the body of each empty capsule held in the empty capsule segment in the turret of the capsule filling machine.

While the slider plate (107) below the dosing disc (108) can be circular, a portion equivalent to the sixth set of through-holes of the dosing disc (108) is sliced out from the slider plate (107) to facilitate pushing out of the slug from the dosing disc (108). As the turret rotates and stops at the smart taming system, the empty capsule segment in the turret is aligned adjacent to the sliced out portion of the slider plate (107) and below the sixth set of through-holes of the dosing disc (108) to receive the pushed out slug in the empty capsule bodies held in the holes of the empty capsule segment. Generally, the size and geometry of the tub (109) is just sufficient to cover five sets of holes of the dosing disc (108) leaving the space above the sixth set of holes of the dosing disc (108) vacant. Thus, when the dosing disc (108) rotates to bring the sixth set of holes below the sixth set of thirteen tamping pistons (110), the tamping pistons (110) push through the sixth set of holes of the dosing disc (108) containing the slug to fill up the body of each capsule in the empty capsule segment aligned below the dosing disc (108) and adjacent to the sliced out portion of the slider plate (107). Thereafter the turret rotates towards a capsule closing station where a cap can be closed over the body of each capsule to form filled capsules, and further towards an ejecting station where filled capsules are ejected. The number of capsules that can be filled with the slug at a time is based on the number of tamping pistons in a set. Thus, the set of thirteen tamping pistons facilitates thirteen capsules being filled with the pharmaceutical ingredient at a time.

It may be appreciated that the smart tamping system (100) as disclosed in this disclosure/specification is not intended to be limited to hexagonally shaped tamping plate (112) with six hexagonally arranged cavities, six sets of tamping pistons (110) and/or thirteen tamping pistons (110) in each set and/or six holder blocks (111) and/or hexagonal arrangement of the holder blocks (111) in the cavities of the tamping plate (112) and/or six sets of through-holes in each of the cover (109*a*) and dosing disc (108) and/or thirteen through-holes in each set in each of the cover (109*a*) and dosing disc (108) and/or hexagonal orientation of the through-holes in each of the cover (109*a*) and dosing disc (108) and/or 60° step-wise rotation of the dosing disc (108) and/or carrying out of the cycle/sequence of compression of the pharmaceutical ingredient in the dosing disc (108) five times. The shape of the tamping plate (112) with the arrangement of cavities therein, the numbers and arrangement of tamping pistons (110), holder blocks (111), through-holes in each of the cover (109*a*) and dosing disc (108) including the orientation thereof, angle of rotation of dosing disc (108), the number of times that the cycle of compression is carried out, etc., are stated only as an example for the sake of brevity and understanding of the invention. The smart tamping system (100) as disclosed in this disclosure/specification can have a tamping plate (112) of any geometric shape with any number of corresponding cavities therein, any number and arrangement of tamping pistons (110), holder blocks (111), first or through-holes (108*a*) in each of the cover (109*a*) and dosing disc (108) including the orientation thereof, angle of rotation of dosing disc (108), the number of times that the cycle of compression is carried out, etc., all falling within the scope of the presently disclosed smart tamping system (100).

In accordance with the aforesaid exemplary embodiment, the tamping system can include six pneumatic cylinders (113). Again, it may be appreciated that the smart tamping system (100) as disclosed in this disclosure/specification is not intended to be limited to six pneumatic cylinders (113), which are stated only as an example for the sake of brevity and understanding of the invention, and that the smart tamping system (100) as disclosed in this disclosure/specification can comprise any number of pneumatic cylinders (113), all falling within the scope of the presently disclosed smart tamping system (100).

Each pneumatic cylinder (113) can be mounted in a pneumatic cylinder housing (114) which can be coupled to the tamping plate (112) by means of a height adjustment screw (115). The rotational motion of the height adjustment screw (115) can cause the pneumatic cylinder housing (114) to slide upwards or downwards thereby adjusting the height or vertical distance of the pneumatic cylinder housing (114) and correspondingly the holder blocks (111) and thereby the tamping pistons (110) along the Z-axis.

In an embodiment, the tamping system can include a control and automation circuit 116 (also referred to as a control unit 116, herein) operatively coupled to a set of first sensors associated with the capsule filling machine. The set of first sensors can be configured to detect, at least at one station of the capsule filling machine, absence of one or more capsule caps in capsule holders associated with a turret of the capsule filling machine, and correspondingly transmit a set of first signals to the control unit (116). The control unit (116) upon receiving the set of first signals, can transmit a set of first control signal to the respective pneumatic cylinders (113) to restrict the movement of the tamping pistons (110) into corresponding first holes which are configured to be aligned with the empty capsule segments of the turret where no capsule bodies were present, irrespective of the movement of the holder blocks (111) towards the lowered position.

Further, based on the received set of first control signals, the pneumatic cylinders (113) can further restrict the movement of all of the tamping pistons into the corresponding first holes (of the dosing disc 108) through which no delivery of slug was allowed, for a predefined rotational cycle of the dosing disc (108) until the same first holes again align with the empty capsule segment of the turret having the empty capsule bodies present on them. This restriction of movement of all the tamping pistons (110) into the corresponding first holes for the predefined rotational cycle of the dosing disc (108) can restrict undesired delivery or pushing out of the slug by the tamping pistons.

In an embodiment, the tamping system (100) can include a set of second sensors configured with the capsule filling machine, and adapted to monitor weight of the filler material filled in the one or more capsule caps, and correspondingly transmit a set of second signals to the control unit (116) when the weight of the filler material in the one or more capsule caps is beyond a predetermined weight. The control unit (116) can be configured to transmit the set of second control signals to any or a combination of the first driving unit (101), and the pneumatic cylinders (113) to control the tamping parameters of the set of tamping pistons (110) based on the monitored weight of the filler material in the one or more capsule caps. In an exemplary embodiment, the tamping parameters can include tamping force, piston stoke, and tamping speed, but not limited to the likes.

Figure 3:
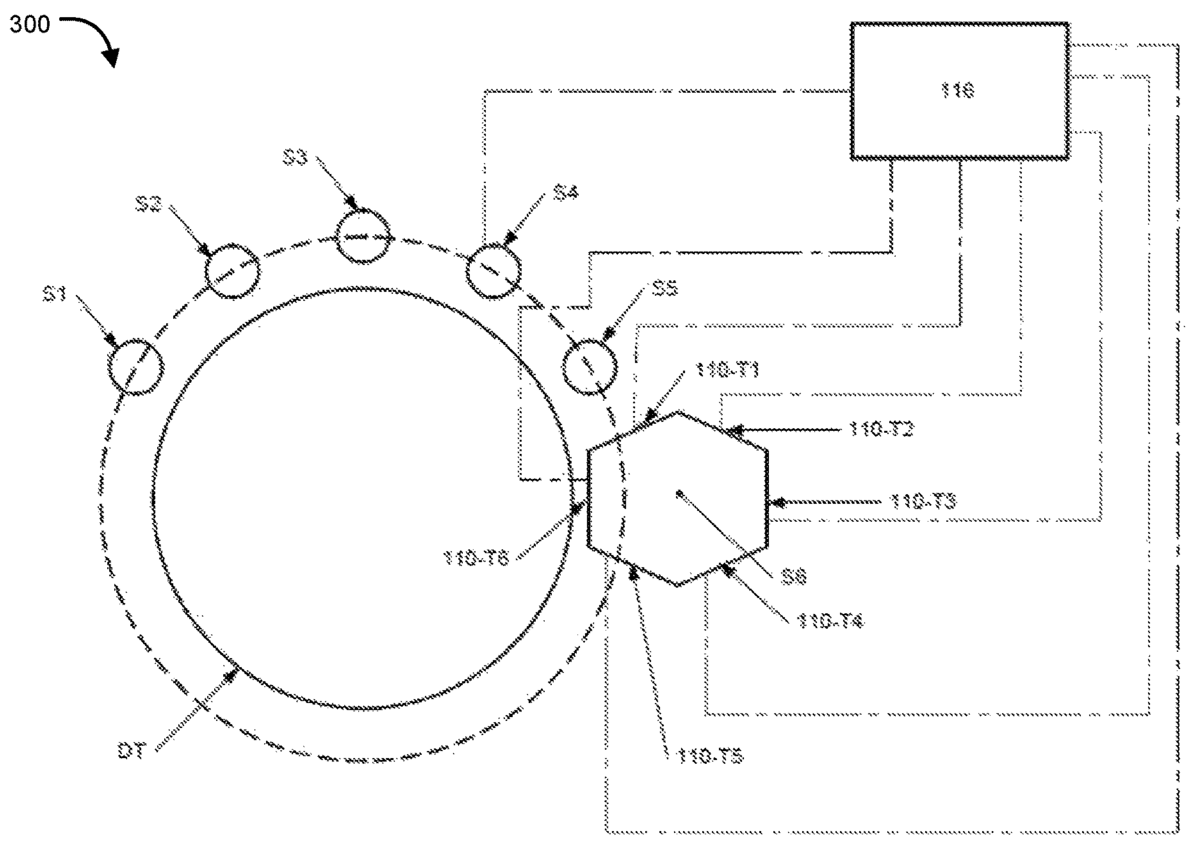
FIG. 3 shows a representative figure illustrating the operation of the smart tamping system for dosage optimization in the capsule filling machine as illustrated in FIGS. 1A and 2A.

Referring to FIG. 3, in an implementation, amongst the different stations (S1-S6) comprised in the capsule filling machine, a fourth station (S4) can be provided for checking and confirming the presence of the cap and/or body of each empty capsule. The first sensors can be deployed at the fourth station (S4) to detect the presence/absence of one or more caps and/or empty capsule bodies in the holes of the empty capsule segment in the turret when the turret reaches the fourth station (S4), and accordingly sends a feedback signal (set of first signals) to the control unit (116). In absence of even a single missing empty capsule cap/body in the any hole of the empty capsule segment, the sensor sends a feedback signal indicating the same to the control and automation circuit (116).

Since the first sensor is deployed at the fourth station (S6), the turret and hence the empty capsule segment with the missing cap/body will reach the smart tamping system (100) located at the sixth station (S6) of the capsule filling machine after two indexed/stepped rotations of the turret. In the meantime, the control unit (116) can transmit the corresponding first set of signals indicating the absence of cap/body in the empty capsule segment to pneumatic actuators in the smart tamping system (100) to actuate the sixth pneumatic cylinder (113) after two indexed/stepped rotations of the turret.

At the tamping system, the vertical displacement of the reciprocating shaft/rods by the first drive unit (102) can cause vertical reciprocating motion of the tamping plate (112) in the downward direction along negative Z-axis to compress the pharmaceutical ingredient by five sets of tamping pistons (110-T1 to 110-T5) in five sets of first holes in the dosing disc (108) and to push out the slug being formed in the sixth set of first holes in the dosing disc (108) to be filled in the body of each empty capsule held in the empty capsule segment in the turret aligned adjacent to the sliced out portion of the slider plate (107) and below the sixth set of first holes of the dosing disc (108). However, the actuation of the sixth pneumatic cylinder (113) by the pneumatic cylinder actuation mechanism can cause the sixth pneumatic cylinder (113) to apply a vertical stroke along positive Z-axis (upward) direction causing the sixth holder block (111) and therefore the tamping pistons (110-T6) housed therein to be vertically displaced upwards along the positive Z-axis, thus preventing the tamping pistons (110-T6) from coming in contact with the slug formed in the sixth set of holes in the dosing disc (108), thereby preventing the slug from being pushed out of the sixth set of first holes in the dosing disc (108) thus optimizing the pharmaceutical dosage.

As the dosing disc (108) thereafter can continue with its 60° step-wise rotation, typically in clockwise direction, to cyclically/sequentially align each of the six set of holes below each of the six set of tamping pistons (110-T1 to 110-T6) in the six holder blocks (111), the sixth set of holes containing the slug can also get cyclically/sequentially aligned below each of the five sets of tamping pistons (110-T1 to 110-T5) before again being aligned below the sixth set of tamping pistons (110-T6). Accordingly, the control unit (116) can send a corresponding first control signal to the pneumatic actuators in the tamping system (110) to cyclically/sequentially actuate each of the first to fifth pneumatic cylinders (113). The cyclic/sequential actuation of the first to fifth pneumatic cylinders (113) by the pneumatic cylinder actuators can cause each of first to fifth pneumatic cylinder (113) to cyclically/sequentially apply a vertical stroke along positive Z-axis direction causing the each of the first to fifth holder blocks (111) and therefore the tamping pistons (110-T1 to 110-T5) housed therein to be cyclically/sequentially vertically displaced upwards along the positive Z-axis, thus preventing the tamping pistons (110-T1 to 110-T5) from coming in contact with the slug formed in the sixth set of holes in the dosing disc (108) as the dosing disc rotates in step-wise manner. Finally, at the sixth step of 60° rotation of the dosing disc (108) the sixth set of holes containing the slug again can get aligned below the sixth set of tamping pistons (110-T6), whereupon the slug can be pushed out of the dosing disc (108) the sixth set of tamping pistons (110-T6) to be filled/delivered in the body of each empty capsule held in the empty capsule segment of the turret of the capsule filling machine, thereby preventing loss of slug and thus resulting in pharmaceutical dosage optimization.

In conventional tamping mechanism, the slug would have been delivered, and absence of empty capsule body in the empty capsule segment, would have caused the slug to fall to the bottom of the tamping station, reducing the machine yield. The last/sixth set of through-holes in the dosing disc would have been be emptied by the last/sixth set of tamping pistons, cycle/sequence of step-wise rotations of the dosing disc for routine tamping operation would have begun. However, the deployment of the pneumatic cylinder actuators in the present disclosure, can prevent the delivery of the slug as per routine. Accordingly, when dosing disc indexes back, its first holes or through-holes can have the slug present, which will not allow additional tamping of the pharmaceutical ingredient. Thus, on sensing the absence of the capsule, a sequential actuation of pneumatic cylinders can take place. Starting within sixth holder blocks, and moving clock wise. The slug can remain in the holes of the dosing disc, unaltered and to be selectively delivered when it again reaches the sixth holder blocks and therefore the sixth set of tamping pistons.

The weight of each filled capsule exiting the capsule filling machine can also be measured/monitored. If the weight of one or more filled capsules is below/above a predetermined weight, the control unit (116) is configured to send the second set of signal to the pneumatic cylinder actuators (113) and the first driving unit (101) to control any one of the six pneumatic cylinders (113) to apply a vertical stroke along positive/negative Z-axis direction thereby controlling the corresponding holder block (111) and hence the tamping pistons (110) housed therein, to generate a higher/lower amount of tamping force to achieve a higher/lower compression level of the pharmaceutical ingredient in the dosing disc. The smart tamping system (100) can thus enable full scale utilization of the tamping pistons to achieve a desired level of compression of the pharmaceutical ingredient to ensure that the filled capsules are of a pre-defined weight.

Thus, the presently disclosed smart tamping system, prevents wastage of pharmaceutical ingredient/slug to optimize the dosage to filled in empty capsules, and also ensures that each capsule exiting the capsule filling machine is of a pre-defined weight and quality.

It is to be appreciated by a person skilled in the art that while various embodiment of the present disclosure elaborates upon the inventive concept of restricting the movement of the one or more tamping pistons into holes of a dosing disc that align with holes of the empty capsule holders of the turret in a tamping system of capsule filling machines. However, the above inventive concept is not just limited to tamping system, and are applicable to Dosator technology as well as micro dose technology, but not limited to the likes, and all such embodiments are well within the scope of the present invention.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined within formation and knowledge available to the person having ordinary skill in the art.

Advantages of the Invention

At least some of the technical advantages offered by the smart tamping system provided by the present disclosure include:

- optimizing the dosage of a pharmaceutical ingredient/slug to be filled in empty capsules in a capsule filling machine;
- preventing wastage of a pharmaceutical ingredient/slug being filled in empty capsules in capsule filling machine;
- increasing overall yield of the capsule filling machine;
- generating tamping force as per a desired level of compression of a pharmaceutical ingredient;
- ensuring that each capsule exiting the capsule filling machine is of a pre-defined weight and quality; and
- decreasing dusting in the capsule filling machine thereby reducing cleaning time of the machine.

We claim:

1. A tamping system for a capsule filling machine, the tamping system comprising:

a dosing disc provided with a plurality of first holes, and adapted to get at least partially covered with a filler material to be tamped;

one or more holder blocks positioned above the dosing disc, each of the one or more holder blocks comprising a set of tamping pistons, and are configured to move between a first position and a second position, wherein the first position corresponds to a lifted position where the set of tamping pistons are at a predefined height above the dosing disc, and the second position corresponds to a lowered position such that the set of tamping pistons are at least partially disposed in the plurality of first holes; and one or more actuators operatively coupled to one or more tamping pistons associated with the set of tamping pistons corresponding to each of the one or more holder blocks, wherein actuation of the one or more actuators restricts the movement of the corresponding tamping pistons into respective first holes of the dosing disc.

2. The tamping system as claimed in claim 1, wherein the tamping system comprises a control unit operatively coupled to a set of first sensors associated with the capsule filling machine, and wherein the set of first sensors are configured to detect, at least at one station of the capsule filling machine, absence of any or a combination of one or more capsule caps, and capsule bodies in capsule holders associated with a turret of the capsule filling machine, and correspondingly transmit a set of first signals to the control unit.

3. The tamping system as claimed in claim 2, wherein the control unit upon receiving the set of first signals, transmits a set of first control signal to the one or more actuators to restrict the movement of the one or more tamping pistons into corresponding first holes that align with holes of the empty capsule holders of the turret.

4. The tamping system as claimed in claim 3, wherein the one or more actuators, based on the received set of first control signals, restricts movement of the one or more tamping pistons into the corresponding first holes for a predefined rotational cycle of the dosing disc.

5. The tamping system as claimed in claim 2, wherein the tamping system comprises:

a tamping plate configured to accommodate the one or more holder blocks; and one or more actuator housings coupled to the tamping plate, and configured to accommodate the one or more actuators.

6. The tamping system as claimed in claim 5, wherein the one or more actuator housings are coupled to the tamping plate by means of one or more height adjustment screws, and wherein the one or more height adjusting screws are configured to adjust height of the one or more actuator housings, the one or more holder blocks, and the set of tamping pistons, above the dosing disc.

7. The tamping system as claimed in claim 5, wherein the tamping system comprises a first driving unit operatively coupled to the tamping plate, and configured to move the tamping plate and the one or more holding blocks between the first position and the second position.

8. The tamping system as claimed in claim 5, wherein the control unit is configured to transmit a set of second control signals to any or a combination of a first driving unit, and the one or more actuators to control tamping parameters of the set of tamping pistons.

9. The tamping system as claimed in claim 8, wherein the tamping system comprises a set of second sensors configured with the capsule filling machine, and adapted to monitor weight of the filler material filled in the one or more capsule caps, and correspondingly transmit a set of second signals to the control unit when the weight of the filler material in the one or more capsule caps is beyond a predetermined weight; and wherein the control unit is configured to transmit the set of second control signals to any or a combination of the first driving unit and the one or more actuators to control the tamping parameters of the set of tamping pistons based on the monitored weight of the filler material in the one or more capsule caps.

10. The tamping system as claimed in claim 1, wherein the tamping system comprises a second driving unit operatively coupled to the dosing disc, and configured to control rotational parameters of the dosing disc.

11. The tamping system as claimed in claim 1, wherein the dosing disc is configured to rotate by a predetermined angle when the set of the tamping pistons moves from the second position to the first position, and wherein the dosing disc is configured to stop rotating when the set of the tamping pistons moves from the first position to the second position.

12. The tamping system as claimed in claim 1, wherein the tamping system comprises a first plate positioned below the dosing disc, and abutting to a bottom surface of the dosing disc to restrict movement of the filler material from the plurality of first holes, and wherein the first plate is fixed, and the dosing disc is configured to rotate above the first plate.

13. The tamping system as claimed in claim 12, wherein at least a section of the first plate is sliced out to allow movement of the filler material through first holes of the dosing disc corresponding to the sliced section of the first plate.

14. The tamping system as claimed in claim 13, wherein the movement of the set of tamping pistons towards the second position when a non-sliced section of the first plate is below the dosing disc facilitates compression of the filler material in the corresponding first holes to form a slug; and wherein the movement of the set of tamping pistons towards the second position when the sliced section of the first plate is below the dosing disc allows any or a combination of the filler material, and the slug to discharge through the corresponding first holes.

15. The tamping system as claimed in claim 1, wherein the tamping system comprises one or more sliding plates provided with a plurality of second holes and configured to move between a third position and a fourth position, wherein the third position corresponds to a closed position where a bottom end of each of the plurality of first holes is closed by the one or more sliding plates; and wherein the fourth position corresponds to an opened position where the plurality of second holes are aligned with the plurality of first holes and allows any or a combination of the filler material, and the slug to discharge through the corresponding first holes and the second holes.

16. The tamping system as claimed in claim 15, wherein the movement of the set of tamping pistons towards the second position when the one or more sliding plates are in the third position facilitates compression of the filler material in the corresponding first holes to form a slug, and wherein the movement of the set of tamping pistons towards the second position when the one or more sliding plates are in the fourth position allows any or a combination of the filler material, and the slug to discharge through the corresponding first holes and the second holes.

17. The tamping system as claimed in claim 1, wherein the tamping system comprises a third driving unit operatively coupled to one or more sliding plates and configured to facilitate movement of the one or more sliding plates between a third position and a fourth position.

18. The tamping system as claimed in claim 1, wherein each of the one or more actuators comprises a pneumatic cylinder operatively coupled to the corresponding tamping pistons.

19. The tamping system as claimed in claim 1, wherein the one or more actuators is selected from a group comprising any or a combination of electromagnetic actuators, electric actuator, hydraulic actuator, spring-based actuators, and electromechanical actuators.

* * * * *